(12) United States Patent
Hurley

(10) Patent No.: US 8,805,633 B1
(45) Date of Patent: Aug. 12, 2014

(54) FLOW TESTING SYSTEM FOR FLUID NETWORKS

(76) Inventor: Lyndon J. Hurley, Harrisburg, SD (US)

( * ) Notice: Subject to any disclaimer, the term of this patent is extended or adjusted under 35 U.S.C. 154(b) by 407 days.

(21) Appl. No.: 13/183,635

(22) Filed: Jul. 15, 2011

Related U.S. Application Data

(62) Division of application No. 11/800,563, filed on May 7, 2007, now Pat. No. 7,983,869.

(51) Int. Cl.
*G08B 21/18* (2006.01)

(52) U.S. Cl.
USPC .......................................................... 702/114

(58) Field of Classification Search
USPC .......................................................... 702/114
See application file for complete search history.

(56) References Cited

U.S. PATENT DOCUMENTS

| | | | |
|---|---|---|---|
| 1,973,340 A | 11/1934 | Norman |
| 2,548,146 A | 4/1951 | Ferris |
| 2,548,147 A | 4/1951 | Ferris |
| 2,746,720 A | 5/1956 | Cannon |
| 3,417,953 A | 12/1968 | Hillquist |
| 3,565,372 A | 2/1971 | Jones |
| 3,572,380 A | 3/1971 | Jackson |
| 4,063,359 A | 12/1977 | Luscombe |
| 4,183,489 A | 1/1980 | Copher |
| 4,463,858 A | 8/1984 | Bilas |
| 4,478,041 A | 10/1984 | Pollman |
| 4,481,770 A | 11/1984 | Lohbauer |
| 4,523,286 A | 6/1985 | Koga |
| 4,561,459 A | 12/1985 | Jackman |
| 4,600,364 A | 7/1986 | Nakatani |
| 4,869,002 A | 9/1989 | Glenn |
| 4,883,249 A | 11/1989 | Garland |
| 4,961,471 A | 10/1990 | Ovens |
| 4,987,690 A | 1/1991 | Aaldenberg |
| 5,299,770 A | 4/1994 | Sayles |
| 5,330,014 A | 7/1994 | Wagner |
| 5,381,996 A | 1/1995 | Arnemann |

(Continued)

FOREIGN PATENT DOCUMENTS

EP          089412        9/1983

OTHER PUBLICATIONS

Confidence Testing Fire Hydrants, Colorado Springs Fire Department Office of the Fire Marshal Jul. 1998 1st Edition, 11 pages.*

(Continued)

*Primary Examiner* — Tung S Lau
(74) *Attorney, Agent, or Firm* — Jeffrey A. Proehl; Woods, Fuller, Shultz & Smith, P.C.

(57) ABSTRACT

A flow testing system comprises a flow unit for interfacing with a flow hydrant, a pressure unit for interfacing with a test hydrant, a transmitter in a first one of the units to transmit data to a second one of the units, a receiver in the second unit to receive data from the transmitter, and a data storage medium in the second unit to record data. A method includes providing flow and pressure units, interfacing the pressure unit to a test hydrant and the flow unit to a flow hydrant, measuring static pressure by the pressure unit, initiating water flow through the flow hydrant, measuring pitot pressure in the flow, measuring residual pressure in the test hydrant, transmitting the residual pressure measurement from the pressure to the flow unit, and recording the pitot and residual pressure measurements.

16 Claims, 7 Drawing Sheets

(56) References Cited

U.S. PATENT DOCUMENTS

| | | |
|---|---|---|
| 5,503,423 A | 4/1996 | Roberts |
| 5,540,006 A | 7/1996 | Lloyd |
| 5,556,217 A | 9/1996 | Deyo |
| 5,560,130 A | 10/1996 | Bapst |
| 5,662,176 A | 9/1997 | Madgwick |
| 5,746,404 A | 5/1998 | Merko |
| 5,809,779 A | 9/1998 | Bruso |
| 5,876,005 A | 3/1999 | Vasconi |
| 5,937,373 A | 8/1999 | Ferrar |
| 6,009,905 A | 1/2000 | Arnemann |
| 6,056,065 A | 5/2000 | Campbell |
| 6,125,868 A | 10/2000 | Murphy |
| 6,129,371 A | 10/2000 | Powell |
| 6,131,391 A | 10/2000 | Poorman |
| 6,142,180 A | 11/2000 | Woodling |
| 6,155,359 A | 12/2000 | Gardner |
| 6,179,068 B1 | 1/2001 | West |
| 6,550,734 B1 | 4/2003 | Spadea |
| 6,701,913 B1 | 3/2004 | LeDuc |
| 7,017,406 B1 | 3/2006 | Cressman |
| 7,036,606 B2 | 5/2006 | Rossi |
| 7,099,781 B1 | 8/2006 | Heidl |
| 2001/0053970 A1 | 12/2001 | Ford |
| 2003/0107485 A1 | 6/2003 | Zoratti |
| 2005/0075817 A1 | 4/2005 | Kah |
| 2005/0076965 A1 | 4/2005 | Buckner |
| 2005/0166350 A1 | 8/2005 | Buckner |
| 2005/0222933 A1 | 10/2005 | Wesby |
| 2009/0319572 A1 | 12/2009 | Bernard |

OTHER PUBLICATIONS

The Wachs Company, "Automated Valve Operating Systems", Brochure, pp. 1-6.

E.H. Wachs Companies, "Truck Mounted Valve Operator Model TM-7", Product Manual, Jan. 2004, pp. 1-55.

E.H. Wachs Companies, "Wachs ValveCard 1.2", Product Manual, Sep. 1998, pp. 1-26.

Holden & Brook Limited, "Packaged Fire Hydrant Pump Sets" Brochure, Apr. 1989, pp. 1-4, Manchester, England.

Macarena Cavestany Olivares, "Characterization of Irrigation Hydrants and Influence of Their Wrong Behavior on the Performance of an Irrigation Network", Aug. 23, 2006, pp. 1-90.

National Fire Protection Association, "Recommended Practice for Fire Flow Testing and Marking of Hydrants", 2002 Edition, 18 pages.

* cited by examiner

FLOW TESTING SYSTEM FOR FLUID NETWORKS

BACKGROUND OF THE INVENTION

1. Field of the Invention

The present invention relates to flow testing apparatus and more particularly pertains to a new flow testing system for fluid networks that permits conducting flow testing of a hydrant on the water supply system by a single person in a highly automated and accurate manner.

2. Description of the Prior Art

Fluid supply networks, such as municipal water supply systems, typically test the flow and pressure characteristics of outlets, such as hydrants, on the system to determine the capabilities of the system to deliver an adequate flow of water during high water use events such as the fighting of a fire using water from the supply system.

Not only are these characteristics of the municipal water supply system a concern of the municipality in gauging the likely ability of the fire department to fight fires, but insurers of property are also concerned with this capacity in setting insurance rates for the property. Accurate and current data for each hydrant indicates how much water is available from each hydrant, which may affect fire suppression practices at different points on the system so as not to place greater fire fighting water demands on the hydrant than the individual hydrant or hydrants can supply. The hydrant flow characteristics are not measured in isolation from other proximate hydrants, so that fire fighting personnel are aware whether the system will support the use of multiple proximate hydrants without simply diverting the flow from hydrants already opened and being utilized. Additionally, the use of fire fighting equipment to draw water from the hydrant using a pump can increase the flow capacity of water from the water supply system, but attempting to pump water from the hydrant in excess of the safe capacity of water available from the hydrant at that point in the supply system can have effects detrimental to the system due to the creation of a negative pressure condition created in the main. These detrimental effects include triggering a collapse of the water main or the introduction of contaminants into the main through cracks or joints in the pipe. Thus, knowledge of the actual flow capabilities of the water supply system at a hydrant is needed as guidance to fire fighting personnel seeking to draw water from the hydrant in emergencies.

Similarly, in an actual firefighting situation, it is desirable to monitor the residual pressure in the water supply system as water is being pumped or drawn out of the supply system by fire fighting equipment to ensure that the pressure in the supply system does not fall below a desired threshold pressure and possibly cause the aforementioned problems.

Further, flow test data can provide information for the water supply system for system managers to estimate the capabilities of water mains and plan system upgrades and expansions. Hydrant flow characteristics can affect decisions as to what fire protection and fire resistance features are required for areas of new developments, and where priorities should be placed with respect to upgrading older, smaller water mains. Such testing can indicate systemic weaknesses such as failing water mains and compromised valves.

The testing is typically conducted on a periodic basis, since water supply systems are constantly being affected by changing conditions, including improvements to the system, deterioration of parts of the system, and changes in usage of the system, etc. The testing of hydrants in a water supply system may follow the requirements of National Fire Protection Association (NFPA) No. 291, entitled "First Flow Testing and Marking of Hydrants". In general, the testing of hydrants in a municipal water supply system involves the measurement of static pressure, residual pressure and pitot pressure with respect to the subject hydrant being tested. However, the procedures of such testing are not performed only at the subject hydrant being tested, but also at another hydrant proximate on the water supply system to the subject hydrant, in order to get an accurate idea of the subject hydrant's individual characteristics and efficiency. More specifically, static pressure and then residual pressure are measured at the subject hydrant, while pitot pressure is measured in a flow of water at a proximate location on the water supply system, such as a fire hydrant adjacent to the subject hydrant being tested on the water supply system (or other access points to the water flow, even from a nearby residential water service). Because the water in the supply system is flowing at the proximate or adjacent hydrant, the measurements taken at the subject hydrant is substantially isolated from effects such as friction loss, and the measurement of these characteristics is thus more accurate.

It will be noted that although the hydrants are proximate or adjacent to each other in the water supply system, the hydrants are typically widely separated in a geographic sense, and personnel are usually stationed at each of the hydrants to conduct the testing.

Just as significant as the physical separation of the subject hydrant and the proximate hydrant is the temporal requirements of the testing. More specifically, while the static pressure is typically measured at the subject hydrant just prior to opening the proximate hydrant to flow water from the system, the measurement of pitot pressure at the proximate hydrant and residual pressure at the subject hydrant must occur simultaneously.

Due to these geographical and temporal requirements of the testing, one person alone is not able to accurately conduct the testing, and at least two persons are required. Thus, the expense of the testing process is increased by the personnel costs. Also, the simultaneous timing of the measurements is not always reliable, as the personnel must communicate the exact time of the taking of the measurement, once the proximate hydrant valve has been fully opened and the pressure in the water main has stabilized. Communication of this timing is thus often performed verbally by the personnel over a portable radio system. Also, there is rarely if ever any independent verification of the simultaneous timing of the taking of these measurements.

Further increasing the expense and complication of the testing are situations where more than one hydrant needs to be opened to achieve a desirable drop in residual pressure approaching 25 percent from the static pressure. This adds to the personnel expense and complication to the timing of the opening of the hydrants.

In the fire-fighting situation, where it is desirable to monitor the pressure in the water supply system, an additional fire fighter or municipal employee must be stationed at a hydrant proximate to the hydrant from which water is being drawn in order to monitor the residual pressure in the supply system. This situation thus also requires additional personnel simply to monitor flow conditions in the supply system.

It is also desirable to coordinate the opening of the proximate hydrant and the taking of pressure and flow readings in order to minimize the time that the flow hydrant is opened, thereby minimize the amount of water that flows from the proximate hydrant, and thereby minimizing the amount of water that is wasted and that needs to be disposed of.

Using the static, pitot, and residual pressure measurements, the flow rate in gallons per minute may be calculated using the formula:

$$Q = 29.83 \, cd^2 \sqrt{p}$$

where Q=observed flow, c=coefficient, d=outlet diameter, p=pitot pressure.

The available flow may be calculated, subject to some qualifications, using the formula:

$$Q_R = Q_F \times \frac{h_r^{0.54}}{h_f^{0.54}}$$

where $Q_f$=observed flow, $h_r$ is the drop in pressure from the static pressure to the desired residual baseline and $h_f$ is the drop in psi from static pressure to the actual residual pressure that was measured during the test.

Due to the accuracy required in making the measurements, and the labor intensive nature of the taking of the measurements over sometimes long distances, it is believed that there is needed a system for administering the flow testing and recording the various measurements in a manner that is able to increase the accuracy of and decrease the personnel needed for flow testing of outlets on a water supply system.

SUMMARY OF THE INVENTION

In view of the foregoing disadvantages inherent in the known techniques for flow testing now employed, the present invention provides a new flow testing system for fluid networks that permits conducting flow testing of a hydrant on the water supply system by a single person in a highly automated and accurate manner.

To attain this, in one aspect of the present invention, a flow testing system is disclosed for conducting a test event for detecting fluid characteristics in a network of fluid-carrying pipes. The system comprises a flow unit configured to interface with a flow hydrant and measure flow characteristics of flow from the hydrant, a pressure unit configured to interface with a test hydrant remote from the flow hydrant and configured to measure pressure characteristics of fluid at the test hydrant, a transmitter in a first one of the units configured to transmit data to a second one of the units, a receiver in the second one of the units configured to receive data from the transmitter of the first unit, and a data storage medium in the second unit configured to record data, with the data including pressure data from the first unit.

In another aspect of the present invention, a method is disclosed for testing fluid flow in a network of fluid carrying pipes. The method includes providing a flow unit and a pressure unit, the flow unit and the pressure unit being units separately moveable with respect to each other, interfacing the pressure unit to the test hydrant, interfacing the flow unit to a flow hydrant, measuring a static pressure of the fluid at the test hydrant by the pressure unit, initiating a flow of water through the flow hydrant, measuring a pitot pressure in the flow from the flow hydrant, measuring a residual pressure in the test hydrant substantially simultaneously with measuring the pitot pressure, transmitting the residual pressure measurement from the pressure unit to the flow unit, and recording the pitot pressure measurement and the residual pressure measurement at the flow unit.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

One significant advantage of the present invention is the provision of a system for conducting flow testing of a hydrant on the water supply system by a single person in a highly automated and accurate manner.

Further advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given to the following detailed description thereof. Such description makes reference to the annexed drawings wherein.

DESCRIPTION OF PREFERRED EMBODIMENTS

Figure 1:
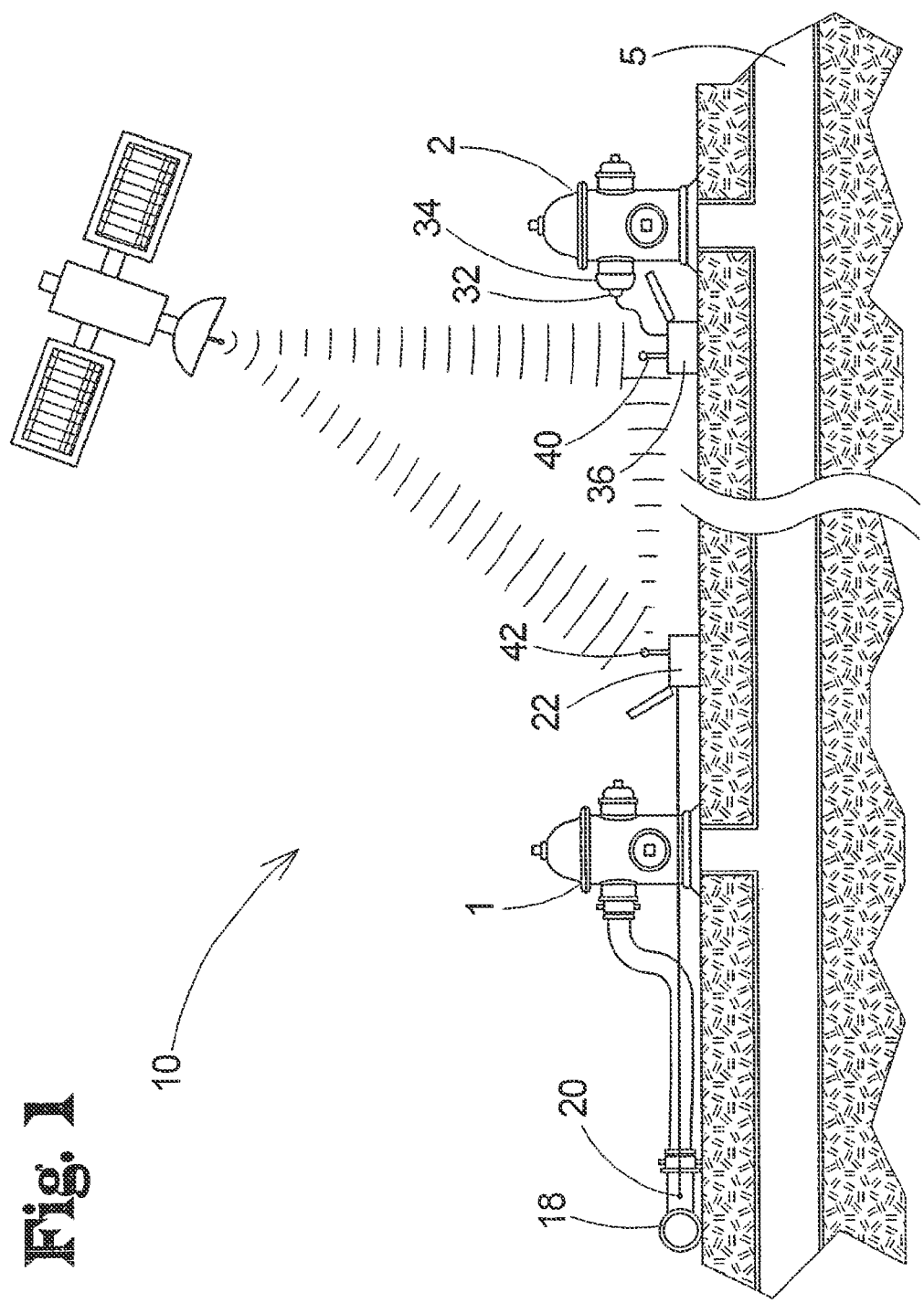
FIG. 1 is a schematic diagrammatic view of a new flow testing system for fluid networks according to the present invention.

With reference now to the drawings, and in particular to FIGS. 1 through 7 thereof, a new flow testing system for fluid networks embodying the principles and concepts of the present invention and generally designated by the reference numeral 10 will be described.

Figure 2:
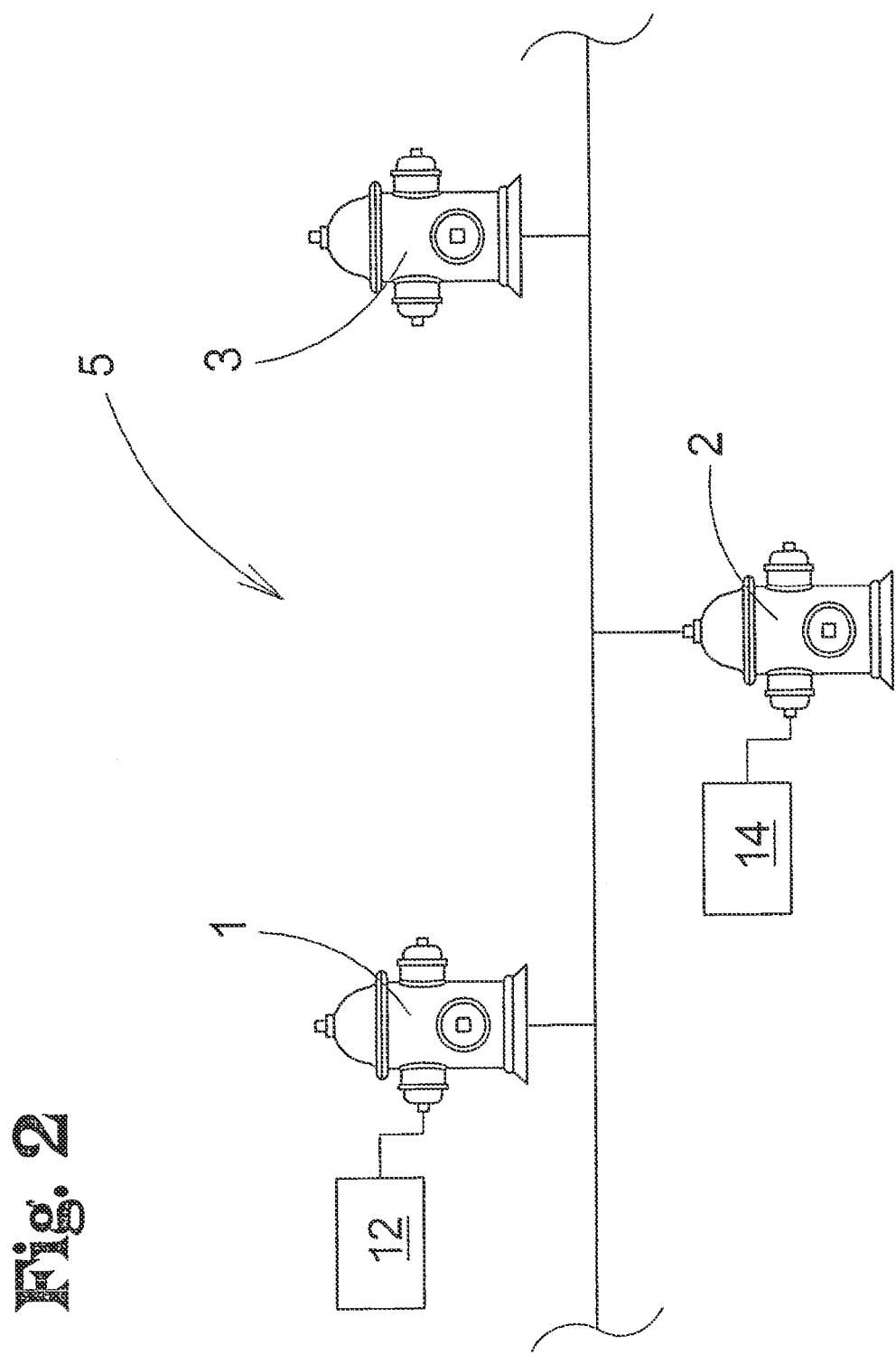
FIG. 2 is a schematic diagrammatic view of the present invention applied to a water supply system.
Figure 3:
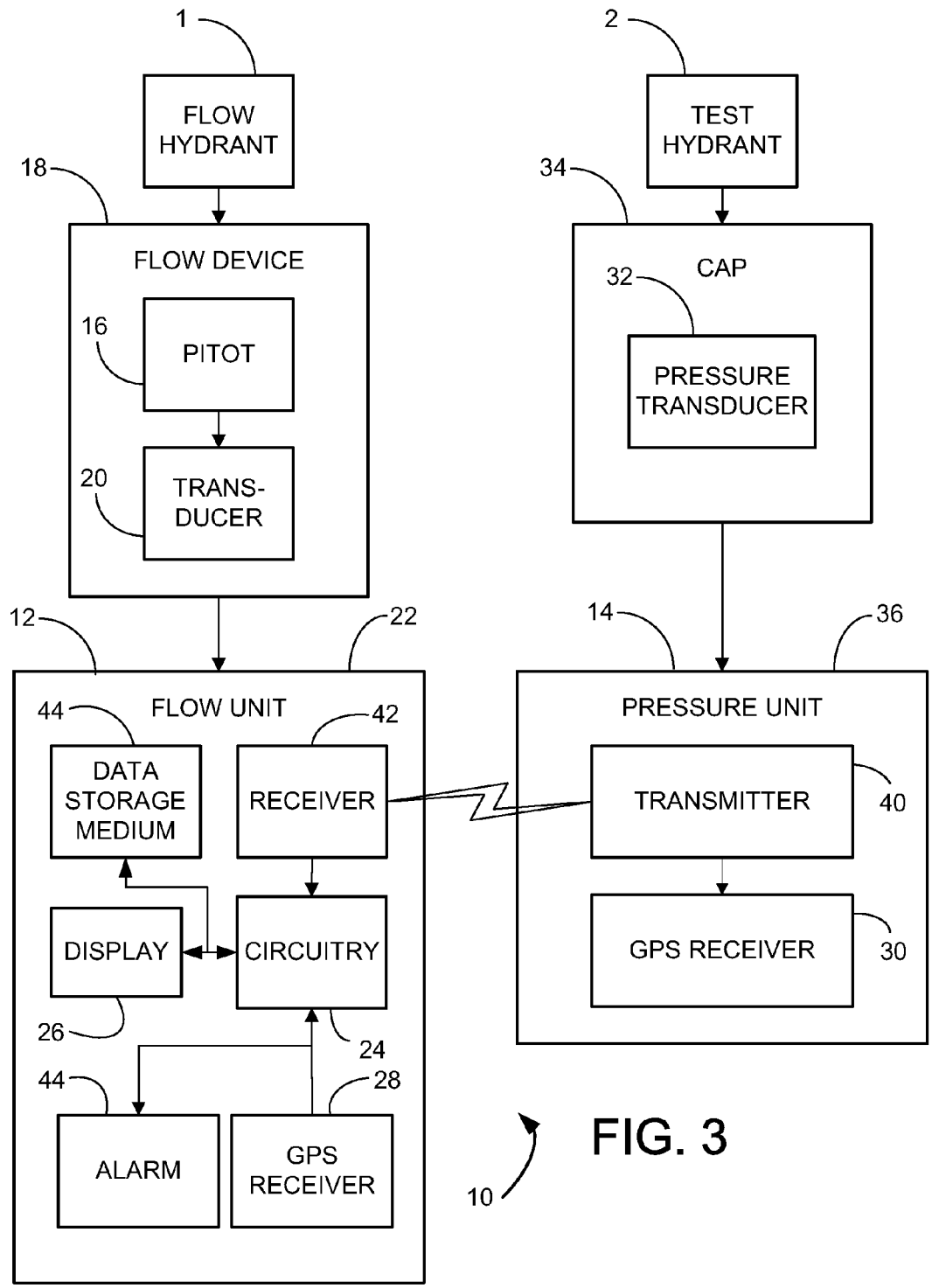
FIG. 3 is a schematic block diagram of the present invention.

One aspect of the invention involves a flow testing system 10 for conducting a test event for detecting fluid characteristics in a network of fluid-carrying pipes (see FIG. 2). The invention is highly suitable for use on water supply system 5, such as are maintained by municipalities or water districts, that includes a plurality of outlets (in addition to those provided for customers of the water supply system) for supplying water for, for example, fire fighting and fire suppression. Typically, these fire suppression outlets take the form of hydrants 1 located adjacent to streets of the municipality. Although the use of the flow testing system 10 is not limited to these hydrants 1, the system 10 will be described in terms of use with the hydrants with the understanding that it could be utilized with other outlets on the water supply system 5.

Water supply systems 5 often include a plurality of the hydrants 1-3 located along the network of water mains that comprise the system 5, and the hydrants may be freestanding or may be mounted on a building. The hydrants 1-3 are spaced or separated from each other by distances that may range from approximately 100 feet or less to approximately 300 feet or more, and likely a significantly greater distance in rural or less populated areas. Two adjacent 1, 2 hydrants on the network of a water supply system 5 thus may not be physically or closely adjacent, but do not have any other hydrants between them on a particular water main (but branches of the water main between the two hydrants may have hydrants thereon). Hydrants 1, 3 that are proximate to each other on the network may have other hydrants 2 located on the network in between the two proximate hydrants, but usually only one hydrant or possibly two hydrants would be located between the proximate hydrants, although proximate hydrants are not necessarily limited to these scenarios.

The flow testing system 10 of the invention may comprise a flow unit 12 (see FIG. 1) that is configured to interface with a flow hydrant 1 and measure flow characteristics of flow from the hydrant 1, and a pressure unit 14 that is configured to interface with a test hydrant 2 that is configured to measure pressure characteristics of fluid at the test hydrant 1. The terminology applied to the units for the purposes of this description is not intended to be limited or to indicate the only or sole function of the respective units, and each units may include additional capabilities of measurement beyond what is suggested by the "flow" and "pressure" terminology. Furthermore, the use of the terminology "unit" is not intended to limit the components and functionality of that unit to a single case or housing, although it will be realized that providing the components and functionality of the unit in a single case or housing can be highly beneficial to the use in the field of the inventive system 10. The test hydrant 2 is the hydrant whose capacity is being tested, and the flow hydrant 1 is being flushed to draw down the system 5 to a level where the ability of the test hydrant 2 to supply water is examined. In some utilizations of the system 10 the test hydrant 2 may be located proximate to the flow hydrant 1, and in some utilizations the test 2 and flow 1 hydrants are located adjacent to each other on the network. In most cases, the text 1 and flow 2 hydrants are physically remote from each other. It should be appreciated that more than one hydrant may be tested at the same time (or approximately the same time), and thus more than one of the pressure units 14 may be utilized during a test with the flow unit 12.

The flow unit 12 of the invention may include the capability to measure a flow rate of fluid flowing from the flow hydrant 1. In an illustrative embodiment of the invention, the flow unit 12 includes a pitot 16, or pitot tube, to measure the pitot pressure, and the pitot pressure may be used to calculate the flow rate of the water flow from the flow hydrant 1, based upon the geometry of a flow device 18 handling the flow from the flow hydrant 1, and other factors. The flow device 18 typically includes a passage through which the water flow from the flow hydrant 1 passes, and the pitot 16 is typically mounted in the passage to measure the pitot pressure of the water flow. The pitot 16 may be used in conjunction with a transducer for detecting the pitot pressure and converting the pitot pressure to an electrical signal. The flow device 18 may be connected to the flow hydrant 1 by a conduit or hose, and the flow device 18 may include a flow diffuser for diffusing the flow of water once the water has passed by the pitot 16. In other implementations, the diffuser may be a separate device that is attached to the flow device 18 by a conduit or hose. One suitable flow device 18 is available under the tradename HOSEMONSTER from Hydro Flow Products, Inc. of 1853 Hicks Road, Suite D, Rolling Meadows, Ill. 60008. Those skilled in the art will recognize that other suitable flow devices 18 are available that implement a pitot 16 for obtaining this measurement for deriving a flow rate calculation.

The flow unit 12 may include a flow unit housing 22 which is preferably portable so as to permit movement of the flow unit from hydrant location to hydrant location. Typically, although not necessarily, the flow unit housing 22 is physically separate from the flow device 18, and the pitot 16 of the flow device 18 (or the transducer in communication with the pitot) is connectable for communication with the flow unit 12, such as through electrical wires, although other means of communicating the pitot pressure, including tubing carrying the pitot pressure, may be employed.

The flow unit 12 may further include various hard-wired or programmable circuitry 24 (see FIG. 3) for detecting or receiving the pitot pressure signal from the transducer 16, and calculating the flow rate of the water from the flow hydrant 1 based upon the calculation using the pitot pressure. The circuitry 24 is preferably, although not necessarily, located on the flow unit housing 22. The flow unit 12 may further include a display 26 for displaying various information, such as the flow rate of the fluid calculated by the circuitry 24.

The pressure unit 14 of the system 10 may include the capability to detect a geographic position or location of the pressure unit, and thus the geographic position of the test hydrant 1 when the pressure unit is positioned adjacent to the test hydrant. This capability may be provided by a Global Positioning Satellite (GPS) receiver 30 that receives GPS signals from the various GPS satellites and converts the signals into geographic location information. In some embodiments of the invention, the flow unit 12 also includes the capability to detect a geographic position or location of the flow unit, and thus the location of the flow hydrant 2 when the flow unit is positioned adjacent to the flow hydrant. This capability may also be provided by a GPS receiver 28 that receives GPS signals from the various GPS satellites and converts the signals into geographic location information.

The pressure unit 14 may further include the capability to measure the pressure of fluid at the test hydrant 2, which thus may provide the capability to measure both the static pressure and the residual pressure at the test hydrant 2, depending upon whether water is flowing from the flow hydrant 1. Both pressure measurements may be made using the same device, such as a pressure transducer 32, that is mountable on the test hydrant in fluid communication with the water main. Illustratively, the pressure transducer 32 may be mounted on a cap 34 that is removably mountable on one of the outlets of the test hydrant, and the pressure transducer 32 is mounted in communication with an aperture in the cap 34.

The pressure unit 14 may further include a pressure unit housing 36 which may be separate and movable with respect to the flow unit housing 22. The GPS receiver 30 may be mounted on the pressure unit housing 36. The pressure transducer 32 and the cap 34 may be separate from the pressure unit housing 36, but may be connected by wires for communicating signals from the pressure transducer 32 to circuitry in the pressure unit housing 36.

The flow testing system 10 may further include a transmitter 40 in a first one of the units 12, 14 for transmitting data to a second one of the units 12, 14. In embodiments of the invention, the transmitter 40 transmits the data wirelessly from the first unit to the second unit using, for example, radio frequency waves although other types and modes of wireless transmission may be used. The transmitter 40 may be configured to transmit the data at a time point that is substantially simultaneous with a test event, such as when a residual pressure measurement is taken at the test hydrant 2, or when the pitot pressure measurement is taken at the flow hydrant 1. The data transmitted by the transmitter 40 may include pressure measurement data at the hydrant associated with the first unit at the time point of the test event. The data transmitted by the transmitter 40 may include calculated flow data at the hydrant associated with the first unit at the time point of the test event. The data 40 transmitted by the transmitter 40 may include geographical position data for the first unit (which will correspond closely with the geographical position of the hydrant associated with the first unit) at the time point of the test event.

In some of the most preferred embodiments of the invention, the first unit is the pressure unit 14 and the second unit is the flow unit 12, which permits a single operator (person) to be positioned at the flow hydrant 1 with the flow unit, while receiving pressure measurement data (e.g., regarding static and residual pressures) from the pressure unit 14, without requiring a second person to be positioned at the pressure unit to record pressure measurement readings. The pressure measurement data is transmitted by the transmitter 40 at the pressure unit 14 at the test hydrant 2, along with the geographical position data of the pressure unit 14, to the flow unit 12. However, the invention is not limited this particular configuration, and the first unit may be the flow unit 12 and the second unit may be the pressure unit 14.

A receiver 42 may be included for receiving data from the transmitter 40, and the receiver 42 may be located with the flow unit 12 to receive data from the transmitter 40 with the pressure unit 14.

A data storage medium 44, such as a memory, may be included for recording data, such as the pressure data and the geographic position data, measured at the time point of the test event or just prior to the text event. The recorded data may include static pressure data from the test hydrant 2 taken prior to the test event, residual pressure data from the test hydrant taken at the time of the test event, and pitot pressure data from the flow hydrant 1 taken at the time of the test event. Optionally, the recorded data may include flow rate data calculated from the pitot pressure data taken at the time of the test event. The recorded data may thus include data transmitted from the transmitter 40 to the receiver 42, and therefore the data storage medium 44 may be located with the second unit, which in many preferred embodiments is the flow unit 12, although the invention is not so limited and the data storage medium may be located with the pressure unit 14.

Figure 4:
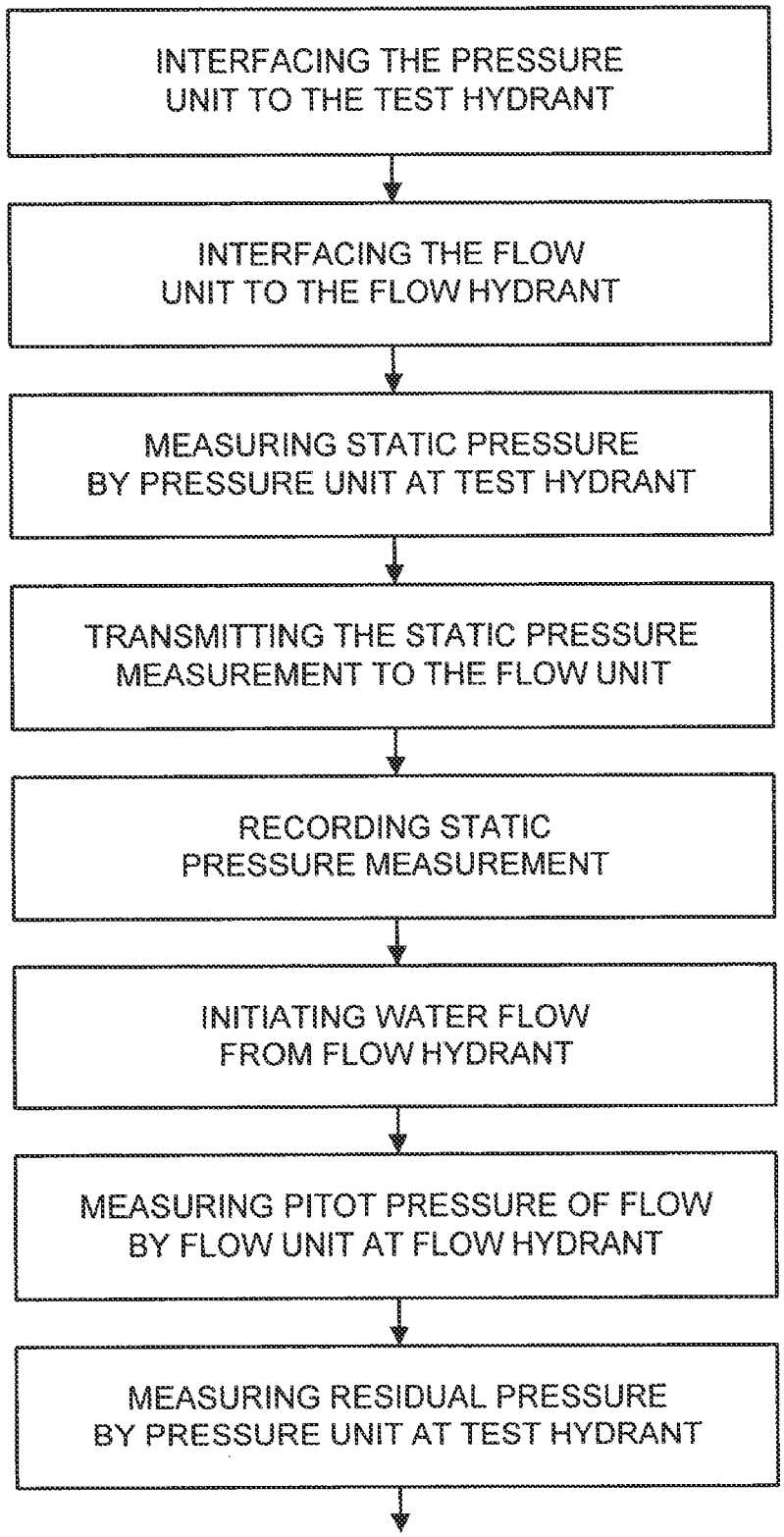
FIG. 4 is a schematic flow diagram of a first portion of an implementation of the present invention for flow characteristic testing.
Figure 5:
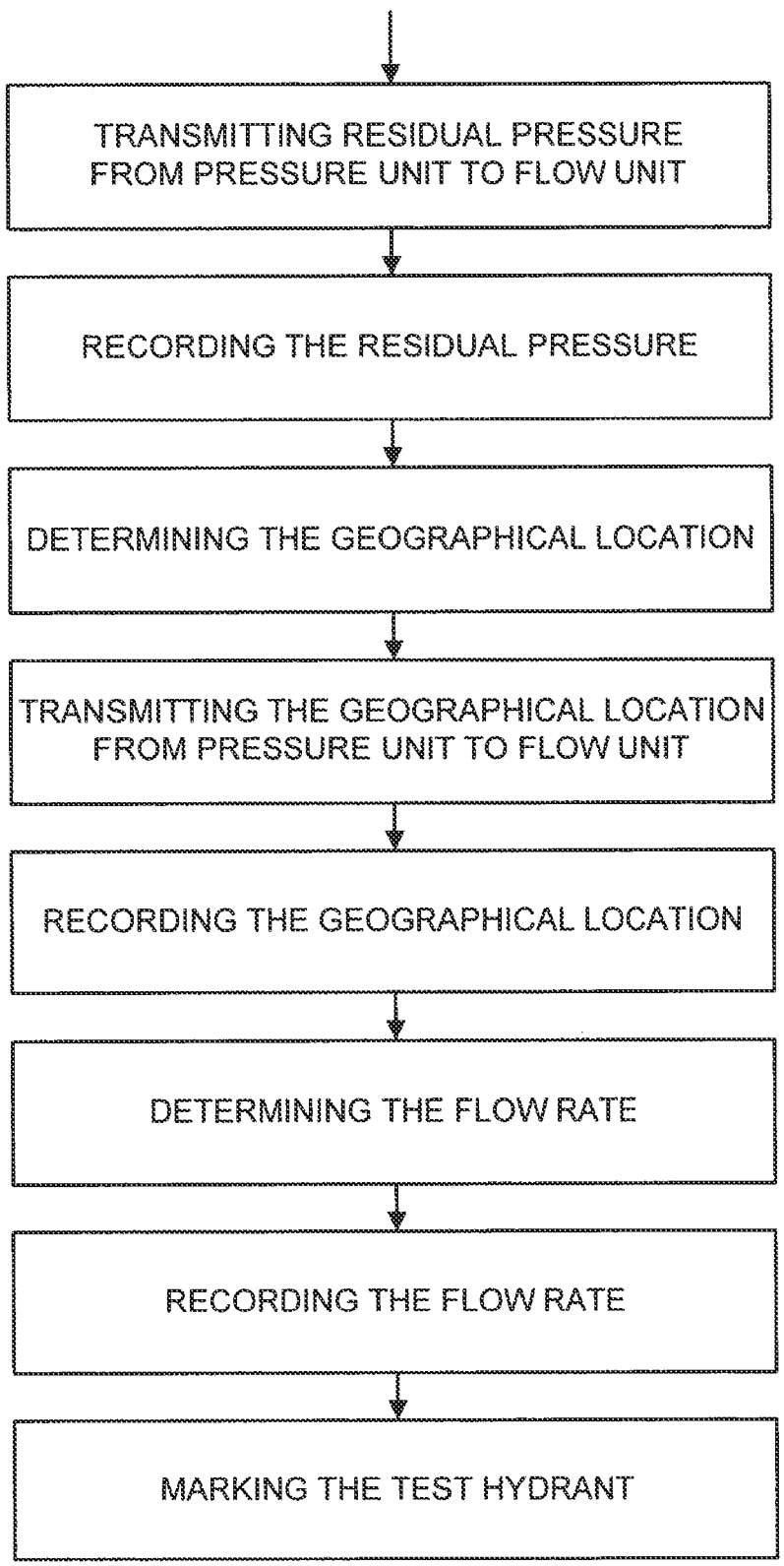
FIG. 5 is a schematic flow diagram of a second portion of an implementation of the present invention for flow characteristic testing.

Another aspect of the invention is a method of testing fluid flow in a network of fluid carrying pipes, as illustratively depicted in FIGS. 4 and 5, utilizing the flow unit 12 and the pressure unit 14 that are separately moveable with respect to each other, and not being physically connected.

The method may include interfacing the pressure unit 14 to the test hydrant 2, which may include the acts of positioning the pressure unit adjacent to the test hydrant, attaching a cap 34 to an outlet of the test hydrant, placing the pressure transducer 32 on the cap in fluid communication with fluid in the test hydrant, and may further include connecting the transducer 32 to the pressure unit 14 and a transmitter 40 of the pressure unit.

The method may further include interfacing the flow unit 12 to the flow hydrant 1. This aspect of the invention may further include selecting a flow hydrant 1 that is located proximate to the test hydrant 2, positioning the flow unit 12 adjacent to the flow hydrant 1, positioning a pitot 16 in a manner to intercept a flow of water from an outlet of the flow hydrant 2. The latter aspect of the interfacing of the flow unit 12 method may include attaching a flow device 18 having the pitot 16 to the flow hydrant 1 and attaching a conduit to the outlet of the flow hydrant 1 and to the flow device 18 to cause the water flow from the flow hydrant to move through the flow device and by the pitot 16.

Once the pressure unit 14 has been interfaced to the test hydrant 2, a static pressure measurement of the fluid at the test hydrant may be taken by the pressure unit 14. The measurement of the static pressure may include transmitting the static pressure measurement from the pressure unit 14 to the flow unit 12. The method may further include recording the static pressure measurement on the data storage medium 44, and may also include displaying the static pressure measurement on one of the units, such as the flow unit 12.

After the static pressure has been measured, flow of water through the flow hydrant may be initiated such as by opening an outlet of the flow hydrant to permit water to flow from the flow hydrant.

The method may further include measuring a pitot pressure in the flow from the flow hydrant, which may include sensing a pressure in the pitot 16 using the transducer 20, and measuring a residual pressure in the test hydrant 2. The measuring of the pitot and residual pressures is most usefully conducted substantially simultaneously, if not simultaneously. The pitot pressure may be recorded on the data storage medium 44.

In implementations of the method, the residual pressure measurement is transmitted from the pressure unit 14 to the flow unit 12, which may be accomplished substantially simultaneously with the act of measuring the residual pressure. The transmitting of the residual pressure measurement from the pressure unit 14 to the flow unit 12 occurs automatically, without user intervention or user initiation of the transmission. The measurement and transmission of the pressure measurement from the pressure unit 14 to the flow unit 12 may occur continuously after measurement of the static pressure. The flow unit 12 receives the residual pressure measurement from the pressure unit, and the residual pressure measurement may be displayed on the flow unit.

The method may also include determining a geographical location of the pressure unit 14, which generally corresponds to the location of the test hydrant adjacent to the pressure unit. The act of determining the geographical location may be accomplished at substantially the same time as measuring the residual pressure. The determination of geographical location may be accomplished by receiving GPS signals by the GPS receiver 30 and determining the geographical location from the GPS signals. The geographical location of the pressure unit 14 is transmitted to the flow unit 12, and may be transmitted to the flow unit with transmission of the residual pressure measurement.

The pitot pressure measurement and the residual pressure measurement may be recorded simultaneously at the flow unit 12. The recordation of the measurements may be triggered by receiving a command from a user to simultaneously record the pitot and residual pressure measurement. The geographical location of the pressure unit 14, as well as the geographical position of the flow unit 12 in those units 12 including a GPS receiver 28, may be recorded simultaneously with the pressure measurements, to create a record with the pressures, location, and optionally the time of the testing.

A flow rate from the flow hydrant 1 may be determined, such as by calculating the flow rate using the pitot pressure measurement, and the flow rate may be recorded in the data storage medium 44. The test 2 may then be marked with a marking that indicates a suitable flow rate for the test hydrant based upon the fire flow testing using the system. In a preferred implementation of the invention, the marking comprises a band that is positionable about a portion of the hydrant for providing an indication of the suitable flow rate of the particular hydrant. The band may bear a visually discernable indication, such as, for example, a color, of a suitable maximum flow rate for the hydrant. The band may also bear a machine-discernable indication, such as, for example, a bar code, of the suitable maximum flow rate and may also include an indication of other data, such as an identification number for the hydrant, which may be used to recall or download data about the characteristics of the hydrant from a database. The bar code may be scanned by a scanner when the hydrant needs to be used, for example, to extinguish a fire.

In various embodiments of the invention, one of the units 12, 14, and most preferably the flow unit 12, may be provided with an alarm 50 that is triggered by the occurrence of a pressure condition in the test hydrant 2 detected by the pressure unit 14. In some embodiments, the alarm 50 is triggered when a pressure is detected by the pressure unit 14 that is below a threshold level. The alarm 50 may produce an audibly-perceptible alarm (e.g., a siren or buzzer) or a visually-perceptible alarm (e.g., a flashing light or flashing icon on a display). The operation of the alarm 50 may be turned off and on depending upon the circumstances. The alarm 50 may be configured to be triggered when the pressure at the test hydrant 2 falls below a threshold pressure of, for example, approximately 20 psi. It is typically desirable to avoid pressures in the water supply system 5 that fall below approximately 20 psi. Thus, during high water usage events such as fire fighting, it is desirable to monitor the pressure in the local portion of the water supply system 5 to verify that the water being drawn from the supply system 5 by, for example, a pumper fire fighting truck, does not cause the residual water pressure to drop below a threshold level such as the 20 psi level.

Figure 6:
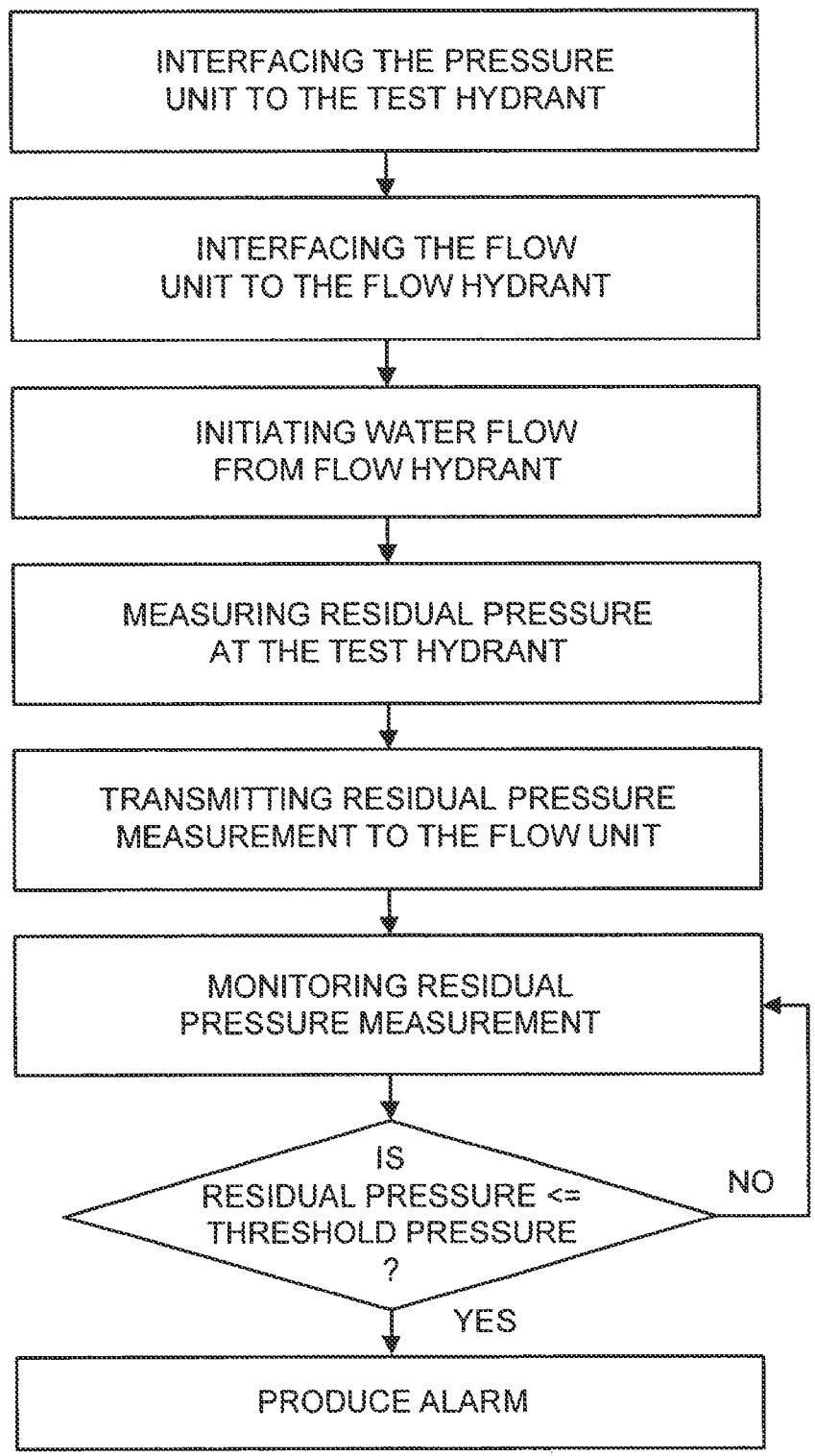
FIG. 6 is a schematic flow diagram of another implementation of the present invention for monitoring high water usage events such as fire fighting.
Figure 7:
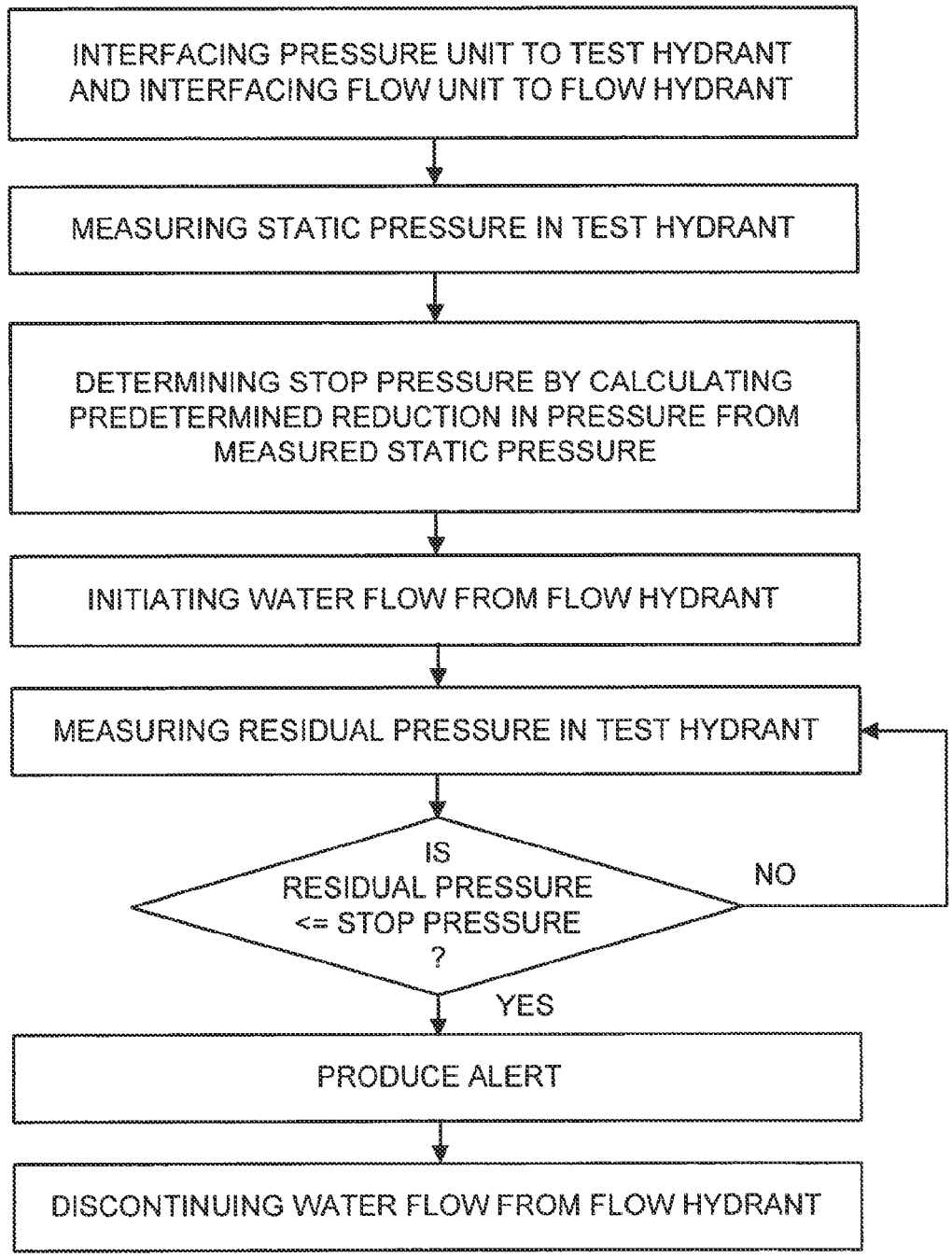
FIG. 7 is a schematic flow diagram of still another implementation of the present invention for facilitating the monitoring of pressure changes during flow testing.

Embodiments of the invention so configured are thus useful for use during fire fighting events by fire fighting personnel to monitor the (residual) pressure in the water supply system 5 at a hydrant proximate to a hydrant from which water is being drawn from the system 5 (see FIG. 6). The system 10 is suitable to provide a warning to the personnel if the (residual) pressure in the system falls below a preset or predetermined threshold pressure (or optionally below a predetermined percentage of the normal pressure), such as, for example, the approximately 20 PSI level. The alarm, whether audible or visual or both, may be perceived by the fire fighting personnel who can make suitable adjustments to the pumper equipment to restore a residual pressure above the approximately 20 PSI level. Optionally, the flow unit 12 may be positioned next to the flow hydrant 1 supplying the fire fighting water and proximate to the pumper drawing water from the flow hydrant, as well as the personnel operating the controls of the pumper fire fighting truck. The personnel operating the controls at the flow unit 12 has a continuous display (on the display 26) of the residual pressure measured by the pressure unit 14 and transmitted to the flow unit 12. The operation of the alarm 50 may continue and persist until the residual pressure rises above the threshold pressure (for example, above approximately 20 PSI).

In various embodiments and implementations of the invention, the system 10 may include additional functionality for alerting the user of the system if and when the residual pressure in the water supply system 5 has dropped below a predetermined or desired pressure level. This feature can be useful for alerting the user that the pressure level in the water supply system 5 has been reduced by a predetermined fraction or proportion from the initial static pressure. In some flow testing, it is desirable to reduce the pressure level by approximately 25%, so that the residual pressure is approximately 25% of the initial, static pressure when the pitot pressure (and residual pressure) are measured. (Other fractional reductions may be used.) If the user or operator is alerted when the residual pressure reaches the desired reduction from the static pressure level, the user is then able to initiate the measurement of the residual and pitot pressures, and then terminate the flow of water from the flow hydrant, to thereby minimize any waste of water by allowing the flow to continue beyond what is necessary to capture the desired measurements.

In one mode of operation of the system to accomplish the alerting of the user to the desired reduction in pressure in the water supply system (see FIG. 7), the pressure unit 14 is interfaced to the test hydrant 2 and the flow unit 12 is interfaced to the flow hydrant 3. The method further includes measuring the static pressure of the fluid at the test hydrant 2 by the pressure unit 14, and determining a stop pressure level by calculating a predetermined reduction of pressure from the static pressure. The flow of water through the flow hydrant 3 may be initiated. The residual pressure may be measured in the test hydrant 2, and an alert may be produced if the residual pressure measurement is equal to or less than the stop pressure level. In other words, when or at the time that the residual pressure measurement is detected by the system 10 to have reached or fallen below the stop pressure level, an alert (such as, for example, an audible or visual alert) is produced that may be a single alert of finite duration, or intermittent, or may be continuous until the residual pressure rises above the stop pressure level, or the system 10 is reset or turned off.

With respect to the above description then, it is to be realized that the optimum dimensional relationships for the parts of the invention, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method of testing fluid flow in a network of fluid carrying pipes, comprising:

providing a flow unit and a pressure unit, the flow unit and the pressure unit being units separately moveable with respect to each other;

interfacing the pressure unit to a test hydrant;

interfacing the flow unit to a flow hydrant;

measuring a static pressure of the fluid at the test hydrant by the pressure unit;

initiating a flow of water through the flow hydrant;

measuring a pitot pressure in the flow from the flow hydrant;

measuring a residual pressure in the test hydrant simultaneously with measuring the pitot pressure;

transmitting, by a transmitter at the pressure unit, the residual pressure measurement to a receiver at the flow unit; and recording the pitot pressure measurement and the residual pressure measurement on a data storage medium at the flow unit.

2. The method of claim 1 additionally comprising determining a geographical location of the pressure unit.

3. The method of claim 1 wherein recording the pitot pressure measurement and the residual pressure measurement includes receiving a command from a user to simultaneously record the pitot pressure measurement and the residual pressure measurement.

4. The method of claim 1 additionally comprising determining a flow rate from the flow hydrant by calculating the flow rate using the pitot pressure and recording the flow rate.

5. The method of claim 1 wherein interfacing the pressure unit includes placing a pressure transducer in fluid communication with fluid in the test hydrant and connecting the transducer to the pressure unit.

6. The method of claim 1 wherein interfacing the flow unit includes selecting a flow hydrant proximate to the test hydrant and positioning a pitot in a manner to intercept a flow of water from an outlet of the flow hydrant.

7. The method of claim 1 wherein measuring the static pressure includes transmitting the static pressure measurement from the pressure unit to the flow unit and recording the static pressure measurement at the flow unit.

8. The method of claim 1 wherein the transmitting of the residual pressure measurement from the pressure unit to the flow unit occurs automatically.

9. The method of claim 1 wherein the transmitting of the pressure measurement from the pressure unit to the flow unit occurs continuously after measurement of the static pressure.

10. The method of claim 1 additionally comprising marking the test hydrant with a code containing information about the test hydrant.

11. The method of claim 1 additionally comprising producing an alarm by the flow unit if the residual pressure measurement falls below a threshold pressure level.

12. The method of claim 1 additionally comprising determining a stop pressure level by calculating a predetermined reduction of pressure from the static pressure; and producing an alert if the residual pressure measurement is equal to or less than the stop pressure level.

13. The method of claim 2 additionally comprising transmitting the geographical location of the pressure unit to the flow unit.

14. The method of claim 13 wherein recording the pitot pressure measurement and the residual pressure measurement includes recording a geographical location simultaneously with the pitot pressure measurement and the residual pressure measurement.

15. The method of claim 6 wherein interfacing the flow unit includes attaching a flow device having the pitot to the flow hydrant, the flow device including a transducer in communication with the pitot, and connecting the transducer to the flow unit.

16. A method of testing fluid flow in a network of fluid carrying pipes, comprising:

providing a flow unit and a pressure unit, the flow unit and the pressure unit being units separately moveable with respect to each other;

interfacing the pressure unit to a test hydrant;

interfacing the flow unit to a flow hydrant;

measuring a static pressure of the fluid at the test hydrant by the pressure unit;

initiating a flow of water through the flow hydrant;

measuring a pitot pressure in the flow from the flow hydrant;

measuring a residual pressure in the test hydrant simultaneously with measuring the pitot pressure;

transmitting, by a transmitter to a receiver, at least one of the pressure measurements substantially simultaneous with the measuring of the pressure measurement; and receiving the at least one pressure measurement and recording the static pressure measurement, the pitot pressure measurement, and the residual pressure measurement in a data storage medium located with a said unit.

\* \* \* \* \*